(No Model.)
J. Y. BURWELL & F. MAMMEL.
CAR COUPLING.
No. 368,513. Patented Aug. 16, 1887.
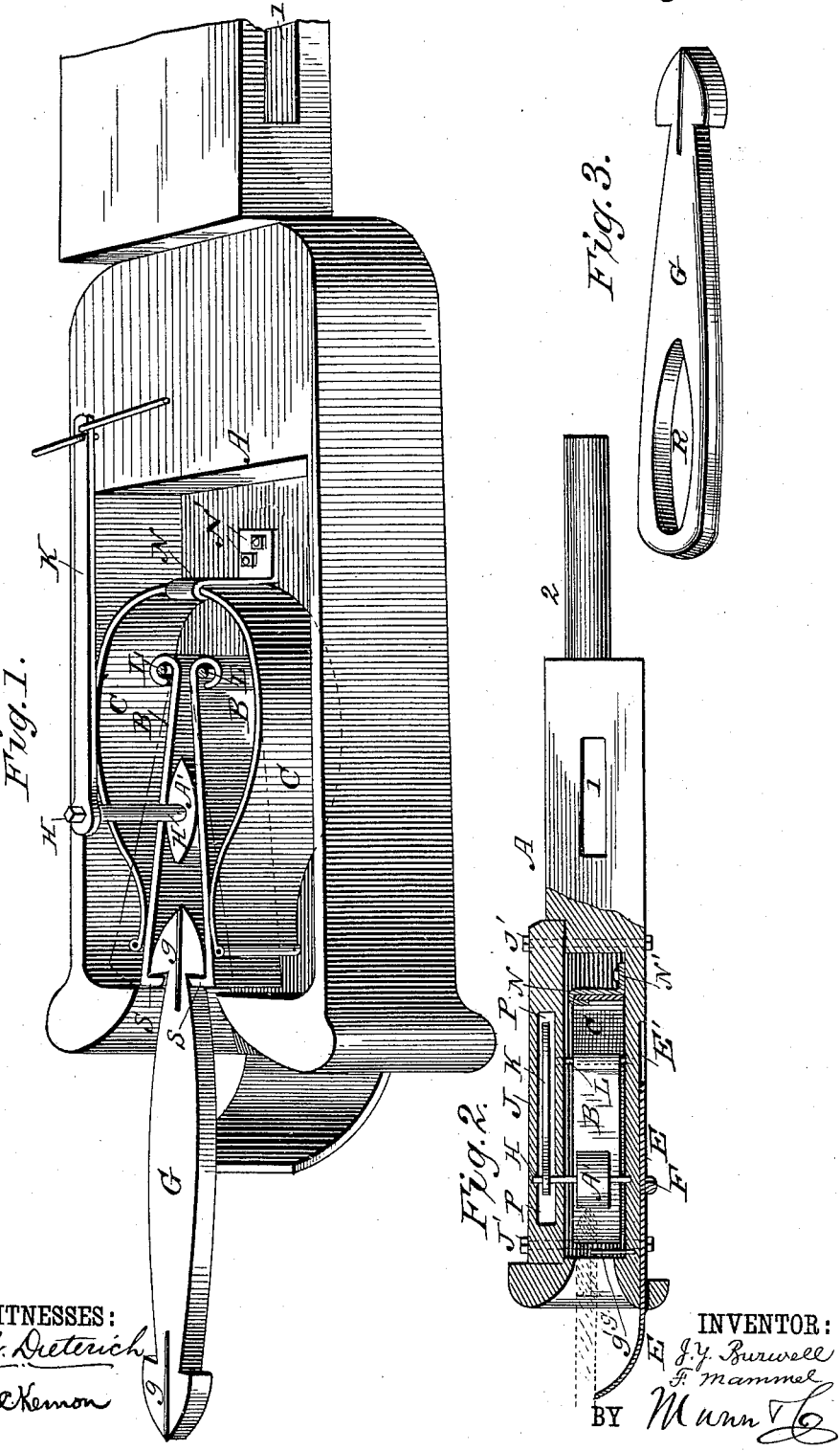
WITNESSES:
Fred G. Dieterich
Jerome Kenon
INVENTOR:
J. Y. Burwell
F. Mammel
BY Munn & Co
ATTORNEYS.
N. PETERS, Photo-Lithographer, Washington, D. C.

UNITED STATES PATENT OFFICE.

JOSEPH YARENTON BURWELL, OF CHICO, AND FRANKIE MAMMEL, OF ROXBURY, KANSAS.

CAR-COUPLING.

SPECIFICATION forming part of Letters Patent No. 368,513, dated August 16, 1887.

Application filed March 23, 1887. Serial No. 232,094. (No model.)

*To all whom it may concern:*

Be it known that we, JOSEPH YARENTON BURWELL, of Chico, Saline county, and State of Kansas, and FRANKIE MAMMEL, of Roxbury, McPherson county, and State of Kansas, have invented a new and useful Improvement in Car-Couplings, of which the following is a specification.

This invention relates to car-couplings; and it consists in the novel construction and combination of the parts hereinafter fully described and claimed.

In the drawings, Figure 1 is a perspective view of the coupling with the top plate removed. Fig. 2 is a longitudinal vertical section through the center of the coupling. Fig. 3 is a perspective view showing a modification of the link.

A is the bumper, provided with the hole 1 and stem 2, so that it may be attached to a car in the ordinary manner.

B B are the clamps pivoted at one end on the bolts L in a recess in the interior of the bumper, and provided with the square-shouldered jaws S at the other end.

C is a spring, shaped like a horseshoe and secured to the bumper by the clamp N and bolts N'. The ends of this spring press upon the clamps B and cause them to engage with the shoulders S of the link G, which is thrust between them. The ends of link G may both be made arrow-shaped, as shown in Fig. 1, or one of them may be an eye, R, as shown in Fig. 3.

J is the top plate of the bumper, provided with an opening, P, for the disengaging lever, and secured to the bumper by the bolts J'.

A' is a cam secured upon the spindle H, which is journaled in the bumper A and top plate, J.

K is a lever secured upon spindle H in the opening P, so that the said cam may be turned from either side of the car for the purpose of forcing apart the clamps B B against the pressure of the spring C, and thus releasing the link.

A small slot, g, is formed in the link, which slides over a small projection, g', on the bumper and serves to keep the link central between the jaws of the clamps B B.

E is a sliding spring for supporting the link, so that it may engage with the bumper of a car which is higher than the one to which the link is already connected. This spring E slides in a groove, E', in the bottom of the bumper, and is provided with a projection, F, for pushing it forward or drawing it back out of the way when not required in use.

The link is made flat and not very thick, so that if the disengaging mechanism should fail to work, a lever or key can be slipped over it for turning on edge, so that it can pass out between the jaws without their being forced apart.

What we claim is—

1. In a car-coupling, the combination of a bumper having an internal recess and the small projection g', the clamps B, pivoted within the said recess, the horseshoe-spring C, secured to the bumper and pressing the clamps together, and a link having a tapering head, shoulders S, and the small slot g, working over the said projections, so that the shoulders may be guided centrally and engage with the clamps, substantially as and for the purpose set forth.

2. In a car-coupling, the combination of a bumper having an internal recess, the clamps B, pivoted within the said recess at one end, the horseshoe-spring C, secured to the bumper and pressing the clamps together, a link having a tapering head and shoulders S, for engaging with the clamps, and the sliding spring E, connected to the under side of the bumper for supporting the link, substantially as and for the purpose set forth.

JOSEPH YARENTON BURWELL.
FRANKIE MAMMEL.

Witnesses:
M. BANKS,
JOHN MAMMEL.